United States Patent [19]

Pfeifer

[11] Patent Number: 5,425,675

[45] Date of Patent: Jun. 20, 1995

[54] TUBULAR SHAFT, PARTICULARLY FOR SHIP PROPULSION

[75] Inventor: Peter Pfeifer, Salzburg, Austria

[73] Assignee: Dr. Ing. Geislinger & Co. Schwingungstechnik Gesellschaft m.b.H., Salzburg, Austria

[21] Appl. No.: 45,470

[22] Filed: Apr. 8, 1993

[30] Foreign Application Priority Data

Apr. 16, 1992 [AT] Austria ...................... 787/92

[51] Int. Cl.6 .................. F16D 3/80; F16C 3/00
[52] U.S. Cl. ...................... 464/28; 464/180; 464/183
[58] Field of Search ............ 464/24, 28, 180, 181, 464/183

[56] References Cited

U.S. PATENT DOCUMENTS

| | | | |
|---|---|---|---|
| 3,673,813 | 7/1972 | Wright | 464/24 |
| 3,791,169 | 2/1974 | Wright | 464/24 |
| 4,127,080 | 11/1978 | Lakiza et al. | |
| 4,341,484 | 7/1982 | Peterson et al. | 464/28 X |
| 4,712,663 | 12/1987 | Teraoka | 464/24 X |
| 4,825,718 | 5/1989 | Seifert et al. | 464/180 X |
| 4,863,416 | 9/1989 | Gupta | |
| 5,195,930 | 3/1993 | Hirano et al. | 464/180 |

FOREIGN PATENT DOCUMENTS

| | | | |
|---|---|---|---|
| 2716249 | 10/1977 | Germany | |
| 2728101 | 1/1978 | Germany | 464/24 |
| 3438802 | 5/1985 | Germany | |
| 3822417 | 1/1989 | Germany | |

Primary Examiner—Daniel P. Stodola
Assistant Examiner—Eileen A. Dunn
Attorney, Agent, or Firm—Collard & Roe

[57] ABSTRACT

A tubular shaft comprises a torque-transmitting tubular structure comprising at least one torque-transmitting shell, which has elastic properties oriented along at least one helical line. To permit the tubular shaft to be used as an effective vibration damper, the shell surrounds a pumping chamber, which is adapted to contain a damping liquid and communicates through at least one constricted passage with a reservoir for damping liquid.

7 Claims, 2 Drawing Sheets

TUBULAR SHAFT, PARTICULARLY FOR SHIP PROPULSION

BACKGROUND OF THE INVENTION

1. Field of the Invention

This invention relates to a tubular shaft, particularly for ship propulsion, comprising a torque-transmitting tubular structure that comprises at least one torque-transmitting shell having an elasticity extending along a helical line.

2. Description of the Prior Art

Propulsion systems in which periodic torsional vibration occurs, e.g., all drives that comprise piston engines, must be provided with special compensating and damping means in order to avoid overloads due to resonance and to ensure a satisfactory operation and the required useful life. Extreme conditions will particularly arise in ship propulsion systems, which comprise very powerful two-stroke-cycle engines and long drive shafts and require highly expensive and relatively large vibration dampers. By that vibration damping the resonance peaks can be decreased below the loads which are permissible for the materials employed, particularly in the shafts, and the stiffness of the materials may be reduced to shift the resonance peaks toward lower speeds. To that end it is already known to incorporate an intermediate shaft made of fiber-reinforced plastic material in the shafting of ship propulsion systems so that the shafting is made softer and lighter in weight. The shafts made of fiber-reinforced plastic material must be tubular shafts and may consist of one or more torque-transmitting shells. The reinforcing fibers extend along helical lines and cross each other or their sense of twist changes from shell to shell so that torsional stresses can uniformly be taken up. The fibers are embedded in a synthetic resin and this results in a certain damping property but that damping property remains very small and virtually cannot be influenced. For this reason such a tubular shaft made of fiber-reinforced plastic material cannot be used as an effective damping element within a drive shafting.

SUMMARY OF THE INVENTION

For this reason it is an object of the invention to eliminate said disadvantages and to provide a tubular shaft which is of the kind described first hereinbefore and can be used as a fully effective vibration damper.

That object is accomplished in accordance with the invention with a torque-transmitting shell having an elasticity extending along a helical line and enclosing a pumping chamber, adapted to contain a damping liquid and communicating through at least one constricted passage with a reservoir for the damping liquid. Owing to its helical anisotropy, such a torque-transmitting shell of the torque-transmitting tubular structure will be radially expanded or contracted by a torsional load in dependence on the sense of the load, i.e., on whether the load is applied in the sense of the helical line or opposite thereto. If that shell encloses a pumping chamber, which is filled with damping liquid and which communicates with a suitable reservoir, the change of the volume caused by a torsional load will cause liquid to be displaced or sucked and a torsional vibration will result in a pumping action in step with the torsional vibration load so that the damping liquid will be forced to flow through the constricted passage. That throttling will ensure the desired vibration damping. The damping action can readily be influenced within wide limits by the number and/or cross-sectional area of the constricted passages, by the properties of the damping liquid, by the volume of the pumping chamber and by the course, the strength, and the direction of the anisotropy of the shells so that the tubular shaft has an excellent damping characteristic, which can be well adjusted. That tubular shaft can be employed as desired and can be used in widely differing propulsion systems and eliminates in propulsion systems for ships the need at least for relatively large torsional vibration dampers.

The required anisotropy of the shells can be provided in various ways either by a selection of a special material or by a suitable shape thereof. The shells may desirably consist of fiber-reinforced plastic material, in which reinforcing fibers extend along helical lines to have a twist in a predominant sense, or the shell may have a helical surface structure, e.g., in the form of helical grooves or ribs, so that the resulting anisotropy will result in the desired breathing action under vibrating torsional loads. The decision to select an anisotropy which is due to a material or to a structure can be taken in dependence on additional desired properties of the material, such as stiffness or softness, strength, weight, stability.

On principle it would be sufficient to provide only one torque-transmitting shell and to provide the shaft with a central cavity which constitutes a pumping chamber that is filled with a damping liquid and communicates through a line with a reservoir, which is disposed outside the shaft or in an axially adjacent shaft section. But it will be particularly desirable to provide a torque-transmitting tubular structure which comprises at least two radially spaced apart torque-transmitting shells, which are fluid-tightly joined to each other at both ends and which between said shells define an annular pumping chamber. The elasticity of adjacent shells extends along helical lines that have opposite orientations. Owing to those opposite anisotropies a torsional load will cause the shells to be expanded or contracted in the same sense and the breathing and pumping actions and, as a result, the damping action will be greatly increased. Besides, the annular pumping chamber and the reservoir can be accommodated in the same shaft section.

If the reservoir is constituted by a central cavity within the torque-transmitting tubular structure and radial bores are provided between the central cavity and the annular pumping chamber a design will be obtained which is particularly suitable for a shaft comprising two torque-transmitting shells because the pumping chamber directly cooperates with the central cavity, which constitutes the reservoir, and the damping liquid can easily flow back into the pumping chamber under centrifugal force. There is no need for a reservoir outside the shaft although such reservoir outside the shaft could be provided if the annular pumping chamber communicates through a line with the reservoir. Besides, the shaft is simple and compact.

If the torque-transmitting tubular structure consists of three radially spaced apart torque-transmitting shells and the annular chambers between said shells communicate with each other through passages and constitute a pumping chamber and a reservoir, respectively, there will be no need for a separate reservoir because the annular chambers by their mutually opposite breathing and pumping action will pump the damping liquid as it flows through the passages from one annular chamber to the other in alternation. That design constitutes highly compact damping means, which have excellent damping properties.

It will be desirable to provide constricted passages having adjustable flow areas so that the damping action can be controlled by the selection of the flow area. The flow areas can be adjusted simply if bushings having different sizes, passage-defining screws having different flow areas, or sliding or lift values, are inserted into the passages.

DETAILED DESCRIPTION OF THE PREFERRED EMBODIMENTS

Figure 1:
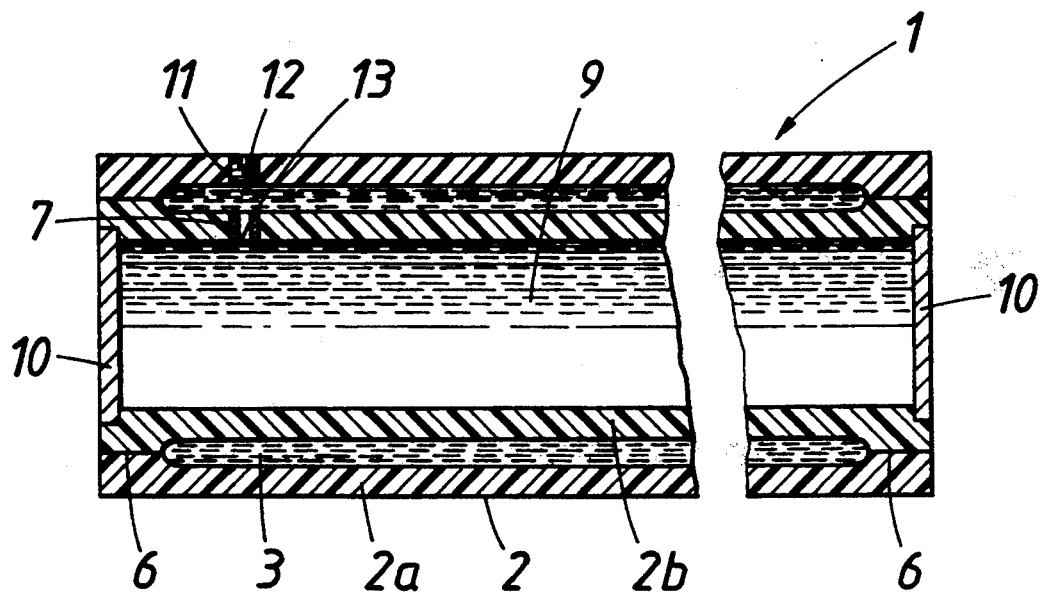
FIGS. 1 and 2 are axial sectional views showing respective illustrative embodiments of a tubular shaft in accordance with the invention.

Referring to the illustrated embodiments, FIGS. 1 to 4 show tubular shaft 1 that comprises a torque-transmitting tubular structure 2 consisting of at least one torque-transmitting shell 2a, b, c, d, e, f, g. Each of said shells has a helical anisotropy. In the embodiments shown in FIGS. 1 to 3, two shells 2a, b or three shells 2c, d, e are provided, which define annular chambers 3, 4, 5 between them and are fluid-tightly joined, e.g., by adhesive joints 6, at both ends. Each of the shells 2a to 2e consists of fiber-reinforced plastic and the reinforcing fibers extend essentially along helical lines, which for each shell have a twist in a predominant sense, i.e., in a left-hand sense $S_L$ or a right-hand sense $S_R$. The predominant senses of twist of adjacent shells are opposite to each other so that the helices of consecutive shells have predominant twists in the left-hand and right-hand senses in alternation.

That arrangement of the fibers results in each shell in a helical anisotropy and under a torsional load in its predominant sense of twist each shell will be twisted further and will thus be radially contracted whereas unter a torsional load in a sense which is opposite to its predominant sense of twist the shell will be untwisted and radially expanded. Because the anisotropies of fibers in adjacent shells are opposite to each other, the torsional loading of the tubular shaft structure will cause the several shells to expand and contract in dependence on their anisotropy and the annular chambers 3, 4, 5 between adjacent shells will be contracted and expanded in step with the vibrational load. If the annular pumping chambers 3, 4, 5 are filled with a damping liquid and are connected via constricted passages 7, 8 to a reservoir for damping liquid, the damping liquid will be pumped and the liquid will be forced through the constricted passages 7, 8 from a given annular chamber into the reservoir or sucked back into the annular chamber from the reservoir. The throttling of the flow will result in an effective damping of the vibration.

In the embodiment shown in FIG. 1 the torque-transmitting tubular structure 2 comprises two torque-transmitting shells 2a, 2b and the annular chamber 3 constitutes a pumping chamber, which through a constricted radial bore 7 communicates with the central cavity 9 of the tubular shaft 1. That central cavity 9 constitutes a reservoir for the damping liquid. For that purpose it is sufficient to seal that central cavity by suitable end covers 10 at both ends. Damping liquid can be filled in through a filling opening 11, which is formed in the outer shell 2a and is coaxial to the radial bore 7 so that said bores can be made without difficulty. Besides, a separate constricting member 13 can be inserted through the filling opening 11 into the radial bore 7 so that the flow area of the constricted passage can be changed. The filling opening 11 can be sealed by a suitable closure 12.

Figure 2:
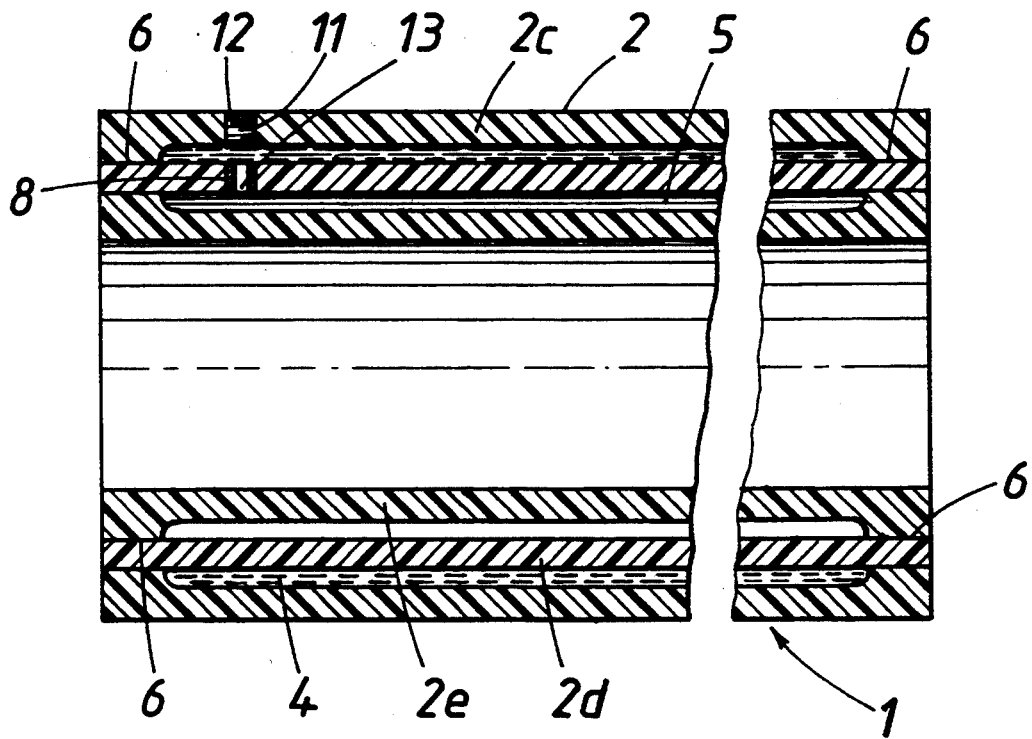
Figure 3:
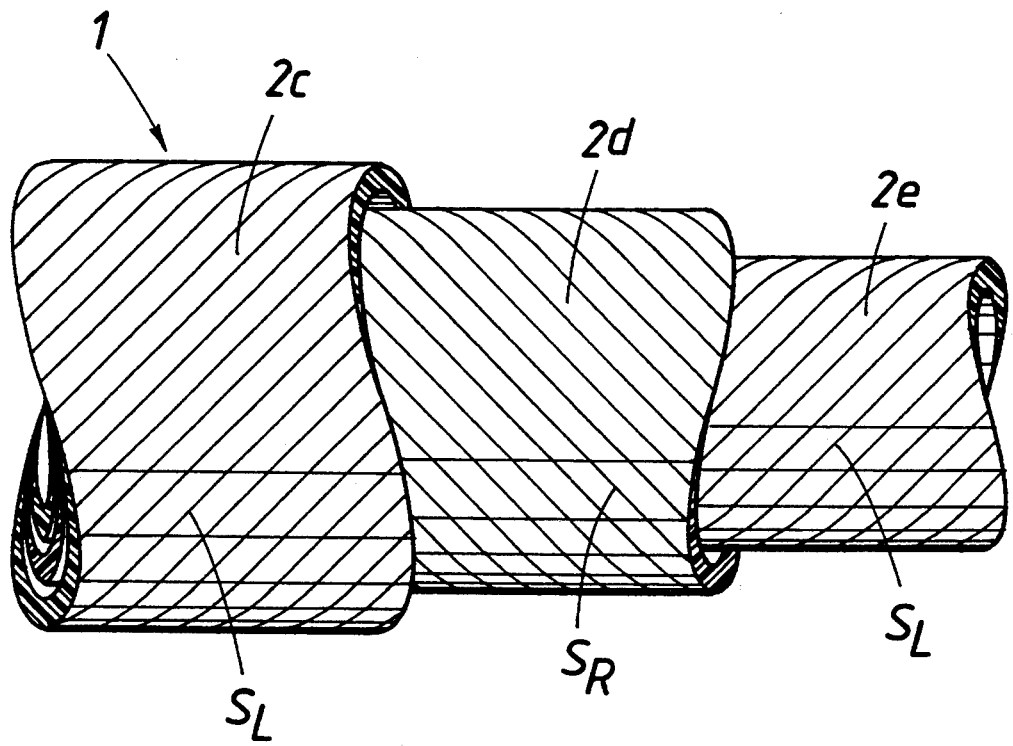
FIG. 3 is an elevation showing partly in section the tubular shaft of FIG. 2.

In the embodiment shown in FIGS. 2 and 3 the torque-transmitting tubular structure comprises three radially spaced apart adhesively joined torque-transmitting shells 2c, 2d, 2e, and two annular chambers 4, 5 between the shells 2c, 2d, 2e communicate with each other through flow passages 8 in the intermediate shell 2d. For this reason the annular chambers may be used as pumping chambers and as reservoirs because under a vibrational load the annular chambers 4, 5 will contract and expand in alternation and the damping liquid which is displaced from the contracting annular chamber will be received by the expanding adjacent annular chamber. A vibrational load will cause the annular chambers 4, 5 to breathe in opposite senses and will cause the damping liquid to flow in opposite directions through the flow passage 8 so that the desired damping action will be achieved. A suitable filling opening 11 is also provided and permits the annular chambers 4, 5 to be filled and the flow passages 8 to be formed. The damping properties can be influenced simply by inserting a constricting member 13 into the flow passage 8.

Figure 4:
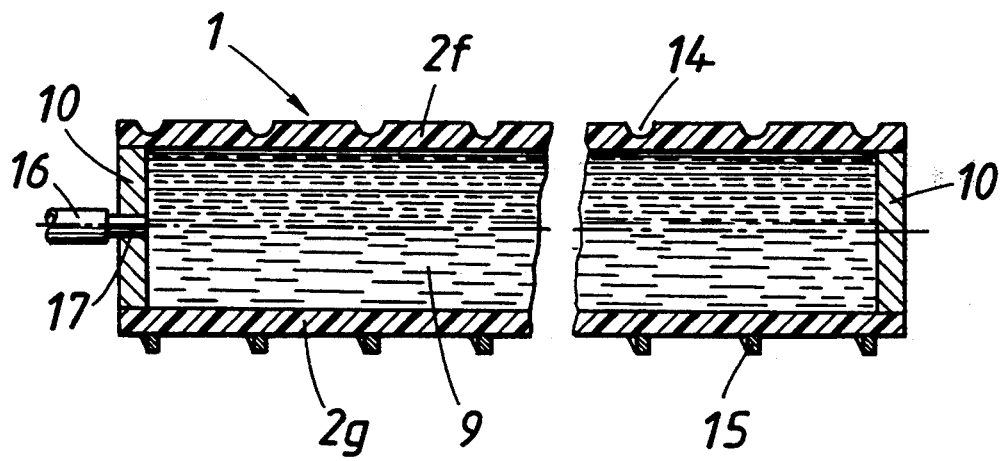
FIG. 4 is an axial sectional view showing a further illustrative embodiment of a tubular shaft in accordance with the invention.

In the embodiment shown in FIG. 4 the helical anisotropy of the shells is not achieved by the use of a material which has orthotropic properties and in which the principal axes of the orthotropism are tangential to helices but by a special shape of the torque-transmitting shells. The tubular shaft 1 shown in FIG. 4 comprises a torque-transmitting tubular structure consisting of a single torque-transmitting shell 2f, 2g, which is formed with helical grooves 14 (as is shown in the top half) or helical ribs 15 (as shown in the bottom half) and thus has the desired anisotropy. In that case the central cavity of the shaft constitutes a pumping chamber, which is filled with damping liquid and which through a line 16 communicates with a reservoir, which is not shown and disposed outside the shaft. Owing to the anisotropy of the shell, a vibrating torsional load will again result in a breathing movement by which damping liquid is pumped in opposite directions between the central cavity 9 and the reservoir through a constricted passage 17, which is provided in one of the end covers 10 sealing the central cavity 9 and to which the line is connected which leads to the reservoir. That pumping action results in a vibration damping.

I claim:

1. A tubular shaft comprising a torque-transmitting tubular structure including at least one torque-transmitting elastic shell having a helical anisotropy, the shell surrounding a pumping chamber adapted to contain a damping liquid, and the tubular structure being provided with a constricted passage for throttling a flow of the damping liquid from a reservoir through the passage into and out of the pumping chamber.

2. The tubular shaft of claim 1, wherein the shell consists of fiber-reinforced plastic, the reinforcing fibers extending predominantly along a helical line.

3. The tubular shaft of claim 1, wherein the shell has a surface defining grooves extending along a helical line.

4. The tubular shaft of claim 1, wherein the shell has a surface provided with ribs extending along a helical line.

5. The tubular shaft of claim 1, wherein the tubular structure includes two of said torque-transmitting shells, the shells being radially spaced apart and having fluid-tightly joined opposite ends, the anisotropy of the shells extending along helical lines oriented in opposite senses, the shells defining the pumping chamber therebetween, an inner one of the shells defining a central cavity constituting. The reservoir for the damping liquid, and the constricted passage connecting the central cavity to the pumping chamber.

6. The tubular shaft of claim 1, wherein the tubular structure includes an inner, an intermediate and an outer one of said torque-transmitting shells, the shells being radially spaced apart and having fluid-tightly joined opposite ends, the anisotropy of adjacent ones of the shells extending along helical lines oriented in opposite senses, the outer and intermediate shells defining the pumping chamber therebetween, the intermediate and inner shells defining the reservoir for the damping liquid therebetween, and the constricted passage is provided in the intermediate shell for connecting the pumping chamber to the reservoir whereby damping liquid contained in the reservoir may flow into and out of the pumping chamber.

7. The tubular shaft of claim 1, further comprising means for selectively adjusting the flow area in the constricted passage.

* * * * *